United States Patent [19]

Moore

[11] Patent Number: 5,174,717
[45] Date of Patent: Dec. 29, 1992

[54] CABLE HARNESS AND MOUNTING HARDWARE FOR PROPELLER DEICER

[75] Inventor: Benjamin N. Moore, Cromwell, Conn.

[73] Assignee: Safeway Products Inc., Middletown, Conn.

[21] Appl. No.: 712,599

[22] Filed: Jun. 10, 1991

[51] Int. Cl.⁵ .............................................. B63H 3/00
[52] U.S. Cl. ................................ 416/39; 244/134 D; 439/353; 439/354
[58] Field of Search .............. 416/39, 31; 244/134 D; 439/353, 354

[56] References Cited

U.S. PATENT DOCUMENTS

| | | | |
|---|---|---|---|
| 2,402,770 | 6/1946 | Poekel | 244/134 D |
| 2,429,061 | 10/1947 | Hunter | 244/134 D |
| 2,444,557 | 7/1948 | Eaton | 244/134 D |
| 2,628,794 | 2/1953 | Radtke et al. | 244/134 D |
| 2,638,295 | 5/1953 | Sheets | 244/134 D |
| 2,643,077 | 6/1953 | Martin et al. | 244/134 D |
| 2,742,248 | 4/1956 | Le compte et al. | 244/134 D |

FOREIGN PATENT DOCUMENTS 0321169 6/1989 European Pat. Off. ............ 439/354

Primary Examiner—Thomas E. Denon
Attorney, Agent, or Firm—Hayes & Reinsmith

[57] ABSTRACT

A wiring harness is provided with connectors which are electrically and physically attached to terminal wires extending from the electrical resistance deicer heater and cables extending from a power supply so that the connectors when assembled, establish the desired electrical connection, the assembled connectors being secured to a bracket fastened to the hub of a propeller, blade with a portion of the bracket being engageable with the assembled connector bodies to hold the connectors in assembled position on the hub.

2 Claims, 3 Drawing Sheets

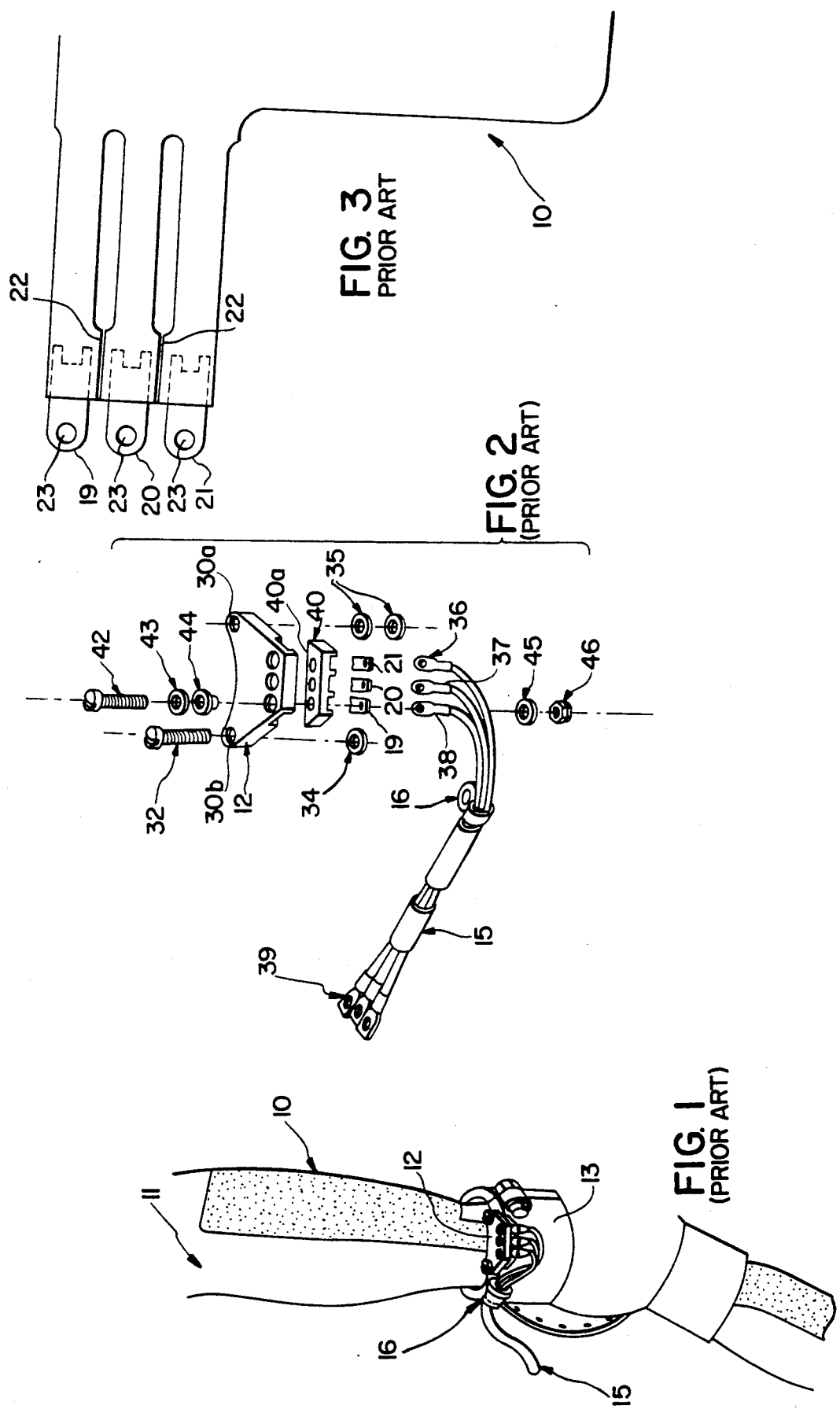

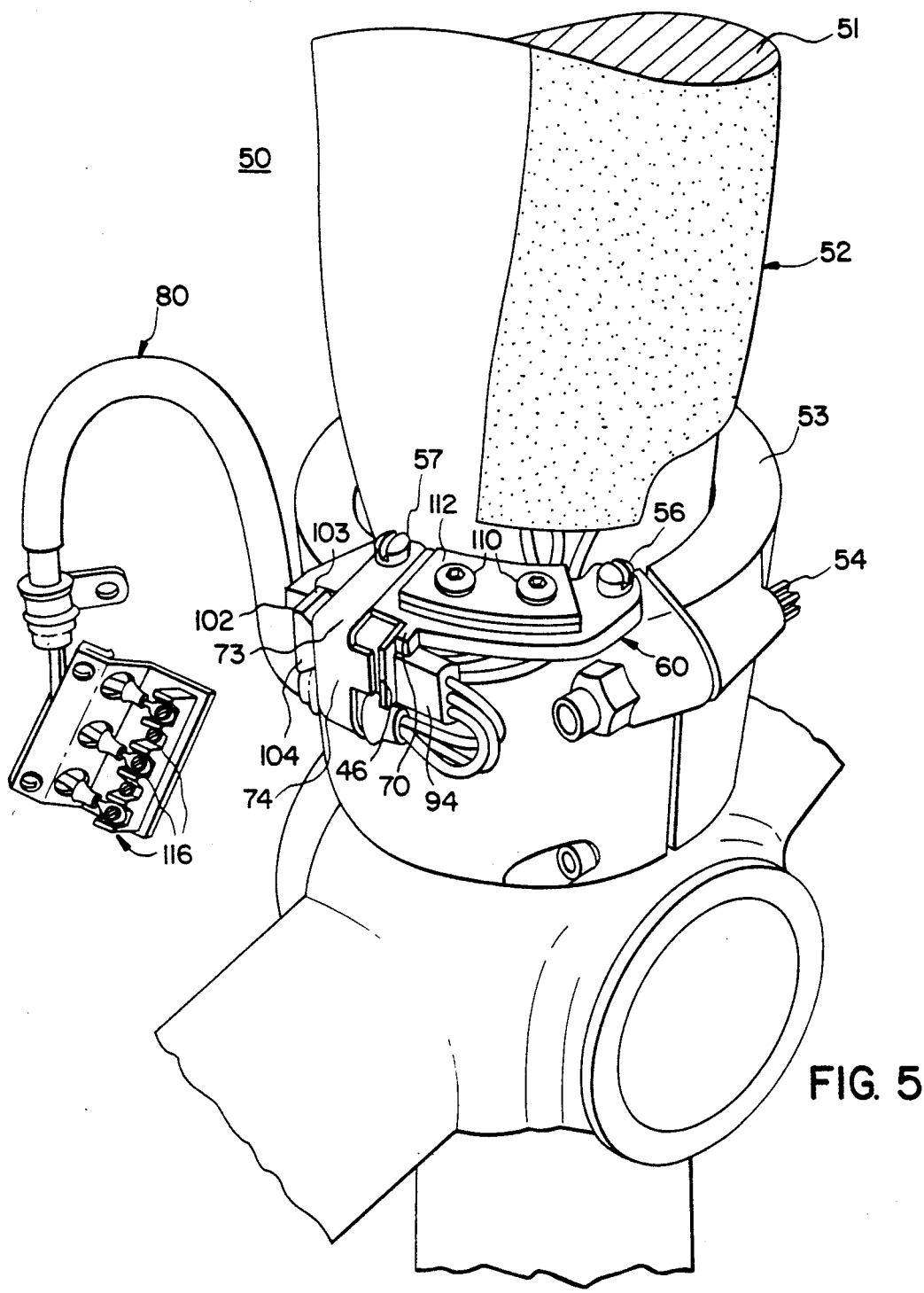
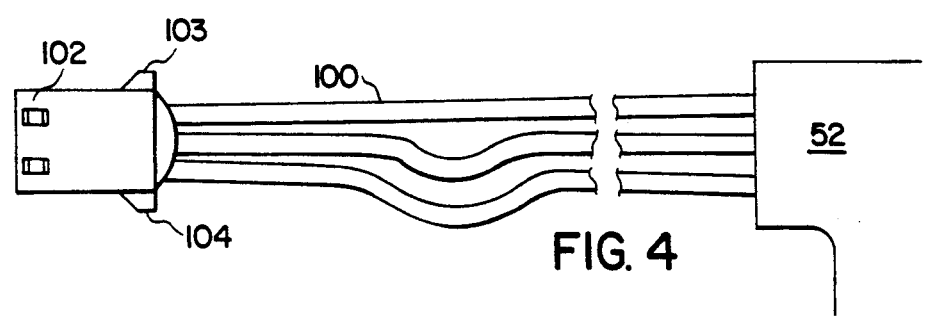
FIG. 5
FIG. 4

CABLE HARNESS AND MOUNTING HARDWARE FOR PROPELLER DEICER

This invention generally relates to electrically operated propeller deicers and more particularly is directed to a wiring harness and mounting hardware for use with such propeller deicers.

BACKGROUND OF THE INVENTION

As described in U.S. Pat. No. 4,386,749 for Propeller Deicer (assigned to B. F. Goodrich Company) electrical resistance heaters are well known in the art for use with propellers to effect deicing of the propeller blades. The problems leading to the formation of ice on portions of the propeller blades, the techniques for removal, and various improvements in the heater structure are well known in the art and U.S. Pat. No. 4,386,749 provides good background for the present invention.

It is also well known in the art that environmental issues cause various types of failure for the electrical resistance deicer heater as well as the wiring harness used to energize that heater. Because of the exposure of the deicer system to such environmental conditions as rain, sand, dust, birds, extreme temperatures, etc., it is essential that the deicer system be easily replaceable while being firmly secured in a facile manner to the propeller blade assembly.

OBJECTS OF THE INVENTION

It is a primary object of this invention to provide a low cost, exceedingly durable and easily installed wiring harness and connection system for use with aircraft propeller electrical resistance deicer units;

It is also a primary object of this invention to provide a harness assembly which significantly reduces the amount of time required for removal of an old deicer unit and installation of a new deicer assembly while at the same time reducing the level of skill required for the installer;

It is a further object of this invention to minimize the requirement for a multiplicity of easily lost parts and pieces for the assembly such as nuts, bolts, cable clamps and the like which increase the cost and time required for assembly; and It is a still further object of this invention to provide a compact assembly to reduce the size of the interconnection system thereby to avoid interference with spinners, etc. often used with propellers.

SUMMARY OF THE INVENTION

A wiring harness is provided with connectors which are electrically and physically attached to terminal wires extending from the electrical resistance deicer heater and cables extending from a power supply so that the connectors when assembled, establish the desired electrical connection, the assembled connectors being secured to a bracket fastened to the hub of a propeller blade with a portion of the bracket being engageable with the assembled connector bodies to hold the connectors in assembled position on the hub.

IN THE DRAWINGS

FIG. 1 is a partial perspective view of a propeller having a prior art terminal assembly for establishing connection to a propeller deicer;

FIG. 2 is an exploded perspective view of the prior art connector assembly shown in FIG. 1;

FIG. 3 is a partial plan view showing the terminals and part of the body of a typical propeller deicer used with the prior art structure of FIGS. 1 and 2;

FIG. 4 is a partial plan view of a propeller deicer provided with a connector of the present invention;

FIG. 5 is a partial perspective view showing a propeller and hub with a deicer boot installed with a bracket of the present invention.

DESCRIPTION OF THE PREFERRED EMBODIMENT

Figure 6:
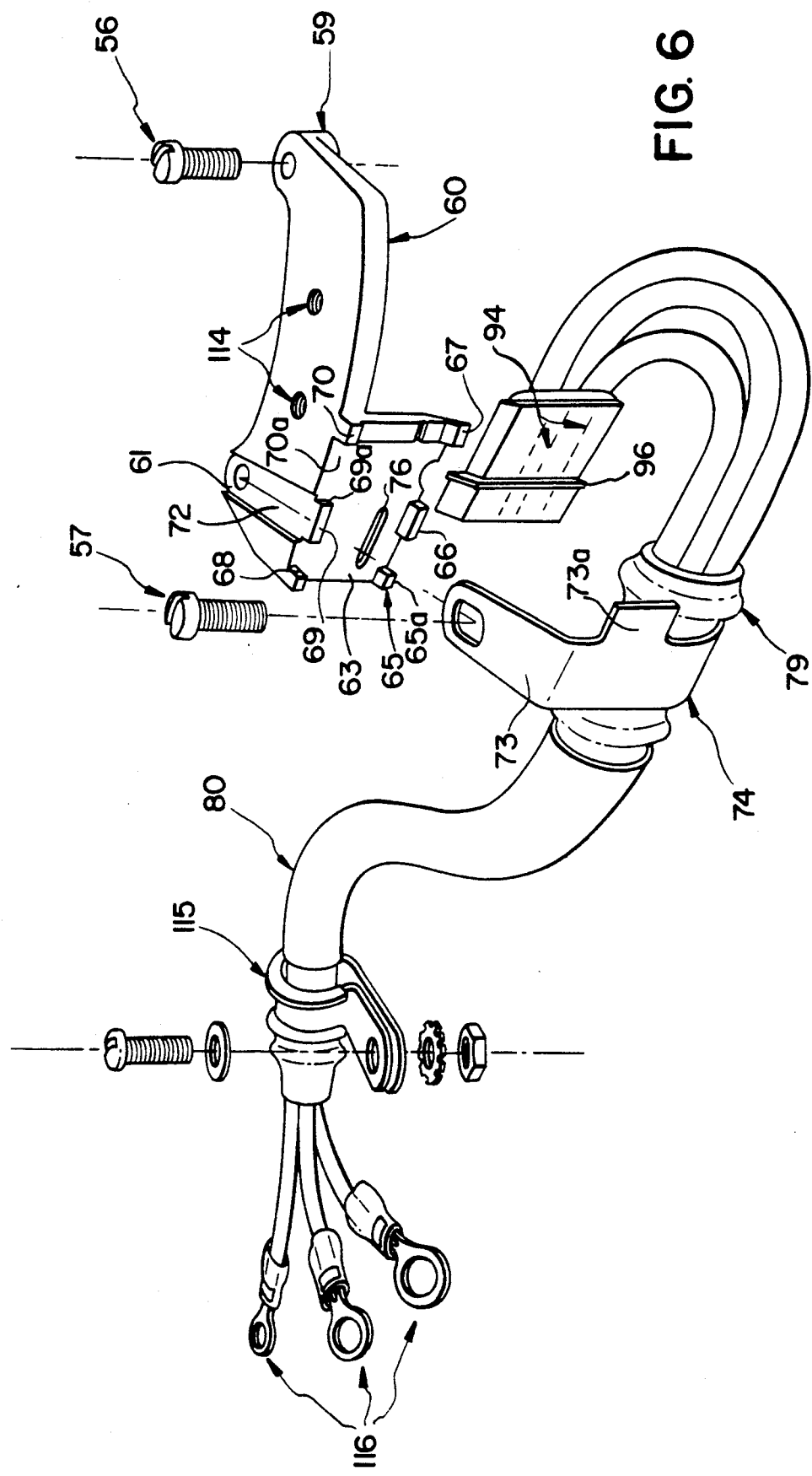
FIG. 6 is an exploded perspective view of the harness assembly of the invention showing the details of the connector and clip assembly.

Before commencing a detailed description of the preferred embodiment of this invention, it is believed essential to make detailed reference to the prior art, particularly FIGS. 1, 2 and 3. FIG. 1 shows a portion of a propeller blade having a deicer 10 affixed to the blade 11 (partially shown), deicer 10 being affixed in any suitable manner and electrical connections being made at the bracket 12 which is secured to the conventional collar 13 of propeller blade 11. The leads extending to the aircraft power supply are partially shown and generally designated 15, the cable leads being held in place on the collar 13 with a suitable clamp fastener 16. FIG. 3 shows the terminal end (only) of deicer 11 and, as indicated, three separate terminals 19, 20 and 21 connect to the resistance heater (not shown) within the deicer 10. The terminals 19, 20 and 21 are provided with separations 22 to permit the desired flexibility and each such terminal is provided with a mounting aperture 23.

Turning next to the details of the mounting bracket 12 shown in FIG. 2, it is seen that the basic bracket structure is provided with end apertures 30a and 30b through which extend suitable mounting fasteners 32 (only one of which is shown) which engage cooperating threaded apertures in collar 13, spacer washers 34 and 35 being provided to complete the mounting arrangement.

In order to effect connection of the terminals 19, 20 and 21 to the terminals 36, 37 and 38 of the cable harness 15 which extends through terminals 39 to the power supply, an insulating block 40 is provided with apertures 40a in alignment with the apertures 41 of the mounting bracket. Fasteners 42 (only one of which is shown) extend through a washer 43 and an insulating bushing 44 thereafter through insulating block 40, the deicer terminals 19, 20 and 21 to electrically engage the terminals 36, 37 and 38, the connection being secured by the washer 45 and the threaded fastener 46. For completeness, it is noted that the clamp 16 for securing the cable 15 in position is attached to the bracket by any suitable fastener arrangement, (not shown).

From the foregoing description it is abundantly clear that removal of the deicer 10 from the propeller blade upon injury or unacceptable wear and tear requires the removal of a variety of fasteners each including nuts and bolts thereby reflecting parts which are easily lost so as to complicate the procedure of reinstalling a deicer.

Turning to FIGS. 4, 5, and 6 which should be viewed together when considering the description and construction of the preferred embodiment, there is shown a propeller blade assembly generally designated 50, an assembly made up of a plurality of individual propeller blades 51, each of which is provided with an electric resistance heater deicer 52 and which is mounted in a hub 53. such hub being generally of a split collar nature secured in its desired position by the fastener 54. The details of the hub and its relationship to the individual propeller blade, many of which blades have adjustable attack angles to vary the pitch of the propeller is not of importance to the invention but rather is typical of the prior art propellers, the propeller of the instant invention being illustrated for convenience in connection with a four-blade construction (portions removed). As with the prior art constructions, a bracket 60 having a general function similar to that of the bracket 12 of FIG. 2 is secured to the propeller hub by the threaded fasteners 56 and 57. A suitable boss or mounting surface 59 is provided adjacent to each of the mounting holes 61 thereby to elevate or position the bracket 60 is spaced relationship above the collar 53 in final assembly.

The bracket 60 serves a multiplicity of functions which simplify the assembly and disassembly of the electrical supply to a deicer.

To begin with, bracket 60 is provided with a downwardly extending wall 63 which is positioned, when the bracket is mounted on the propeller hub, in close proximity to propeller hub 53. On the lower edge of wall 63 are projections 65, 66 and 67 which can be formed integrally if the bracket 60 is machined (or cast) from a single piece of metal such as aluminum and along its upper surface there are provided the projections 68, 69 and 70. The projection 69 is a continuation of the groove 72 formed in the top surface of the bracket 60, which groove accommodates arm 73 of the mounting clip 74, arm 73 being provided with an aperture that mates with the aperture 61 in the mounting bracket so as to be secured in position by the fastener 57 (which serves to mount the bracket to the propeller hub). It is noted that the lower wrapped-around free end portion (not shown) of clip 74 is received in a recess in the back (not shown) of bracket 60 thereby to form a secure mounting means for the connecting cable 80, extending from the propeller power supply, when the bracket 60 is assembled to the hub. If desired a positioning and wear-resistant sleeve 79 can be provided on cable 80, which sleeve is engaged by the mounting clip 74, thereby trapping that portion of the cable in position on clip 74. The three wires making up the cable 80 extend to a connector element 94 and engages suitable terminals (dotted lines 95) for establishing connection to the propeller deicer connections (see FIG. 4). Connector 94 is provided with an outwardly extending ridge or abutment 96 which engages the face 70a of the projection 70 and the face 69a of the projection 69 and similar faces on projections 66 and 67 so as to be trapped and locked in position.

As seen in FIGS. 4 and 5, the wires 100 coming from the conventional resistance heater 52 also extend to a connector 102 which is configured in any suitable way to mate with the connector 96 to establish mechanical and electrical connection therewith. Connector 102 is provided with projecting wings 103 and 104 which engage the projections at 68a and 65a and, when assembled, engage an edge 73a of bracket 73 thereby to rigidly and firmly trap connectors 102 and 94 in assembled relationship on bracket 60 to establish electrical conducting contact while at the same time being rigidly affixed to the bracket 60 by arm 73 of clip 74 such that the connectors cannot be separated unless the clip 74 is removed.

For completeness, it is noted that the connector 94 and the connector 102 are conventional male-female pin and socket electrical connectors. Only the exterior configuration which provides abutment 96 and projections 103 and 104 are structural features of importance to this invention.

From the foregoing description, it is belived clear that applicant has achieved an exceedingly simple, durable and low cost connector assembly and cable harness which can be secured in assembled position to the propeller hub with only two threaded fasteners. For completeness, it is noted in FIG. 5 that two additional threaded fasteners 110 and 111 are shown as fastening weights 112 to bracket to permit static and dynamic balancing of the assembled propeller blade, deicer heater and mounting brackets.

Referring to FIG. 5, the end of the cable which extends to the propeller power supply is provided with a suitable clamp 115 which can be fastened in any particuar manner to a support surface so that terminals 116 can be connected to the power supply. If desired and because of the unique advantages of this mounting bracket construction, that end of the power network can be left connected while the remainder of the assembly is removed, the connectors are disconnected, and the heater is replaced. In that regard it is noted that wires 100 can be utilized from the heater 52 to permit their being trapped under bracket 60 and in the space between bracket 60 and the propeller hub thereby to effectively secure them in position and reduce strain on the connector 102.

When comparing of FIGS. 1 and 5 it is clear that significant simplicity has been achieved while enhancing the durability and rigidity of the mounting structure for the energization of a propeller blade deicer element and that such simplicity greatly enhances the ability of unskilled mechanics to make the needed connections in a facile manner.

Although the invention has been illustrated and described with respect to exemplary embodiments thereof, it should be understood by those skilled in the art that the foregoing and various other changes, omissions and additions may be made therein and thereto, without departing from the spirit and scope of the invention.

I claim:

1. A quick-connect structure for electrically connecting electrical leads from an electrical resistance heater deicer pad mounted on a propeller blade that is, in turn, mounted in a propeller hub to electrical leads from a source of electrical power and comprising:

(a) a first connector member having a housing portion with an outwardly extending projection and having separate electrical terminals for each of the leads from the resistance heater deicer pad, (b) a second connector member having a housing portion with an outwardly extending projection and having separate electrical terminals for each of the leads from the source of electrical power, (c) the first connector member and second connector member jointly being configured for mating mechanical engagement with designated terminals of the first connector member electrically engageable with corresponding designated terminals of the second connector member thereby to make electrical power available to the resistance heater when the connector members are assembled, and (d) a supporting member including means engaging the outwardly extending projection on each connector member for mounting mated first and second connector members on the hub for the propeller blade, the supporting member including a strap removably secured to the mounting means to fix the connector members in assembled relationship as an assembled connector unit and to secure the assembled connector unit in position on the hub relative to the electrical heater, the supporting member being removable to permit disassembly of the connector members and to permit replacement of the resistance heater.

2. The invention of claim 1 wherein the supporting member is provided with raised mounting surfaces for engagement with the hub thereby to define a channel between the mounting surfaces to accept the leads to one of the connectors.

* * * * *